United States Patent
Peng et al.

(10) Patent No.: US 9,994,716 B2
(45) Date of Patent: Jun. 12, 2018

(54) METHOD FOR TREATING POWDER BY DRY MIXING AND POWDER TREATED THEREBY

(71) Applicant: General Electric Company, Schenectady, NY (US)

(72) Inventors: Wenqing Peng, Shanghai (CN); Guoliang Wang, Shnaghai (CN); Michael Francis Xavier Gigliotti, Jr., Glenville, NY (US); Prabhjot Singh, Guilderland, NY (US)

(73) Assignee: General Electric Company, Schenectady, NY (US)

(*) Notice: Subject to any disclaimer, the term of this patent is extended or adjusted under 35 U.S.C. 154(b) by 134 days.

(21) Appl. No.: 14/741,479

(22) Filed: Jun. 17, 2015

(65) Prior Publication Data

US 2016/0002471 A1 Jan. 7, 2016

(30) Foreign Application Priority Data

Jul. 4, 2014 (CN) .......................... 2014 1 0320967

(51) Int. Cl.
| | | |
|---|---|---|
| *B22F 1/02* | (2006.01) | |
| *C09C 3/06* | (2006.01) | |
| *B22F 1/00* | (2006.01) | |
| *B22F 3/105* | (2006.01) | |
| *C22C 33/02* | (2006.01) | |

(52) U.S. Cl.
CPC ............. *C09C 3/06* (2013.01); *B22F 1/0081* (2013.01); *B22F 1/02* (2013.01); *B22F 1/0014* (2013.01); *B22F 3/1055* (2013.01); *B22F 2304/10* (2013.01); *C22C 33/0278* (2013.01); *Y02P 10/295* (2015.11)

(58) Field of Classification Search
CPC ... B22F 1/0003; B22F 1/0007; B22F 2304/10
USPC .......................... 427/216; 428/403; 148/513
See application file for complete search history.

(56) References Cited

U.S. PATENT DOCUMENTS

| | | |
|---|---|---|
| 5,387,380 A | 2/1995 | Cima et al. |
| 6,582,763 B1 | 6/2003 | Nishimura et al. |
| 6,833,185 B2 | 12/2004 | Zhu et al. |
| 8,313,087 B2 | 11/2012 | Hesse et al. |

(Continued)

FOREIGN PATENT DOCUMENTS

| | | |
|---|---|---|
| CN | 101346199 A | 1/2009 |
| CN | 101553447 A | 10/2009 |

(Continued)

OTHER PUBLICATIONS

Yang et al, Dry particle coating for improving the flowabilty of cohesive powders, Powder Technology 158 (2005) 21-33.*

(Continued)

*Primary Examiner* — Hoa (Holly) Le
(74) *Attorney, Agent, or Firm* — General Electric Company; Brian P. Overbeck (57) ABSTRACT

A method for treating a powder, includes: dry mixing the powder with an effective amount of a treating additive to distribute a layer of the treating additive on a surface of a particle of the powder, a primary particle size of the treating additive being smaller than an average particle size of the powder. An associated treated powder is also described.

15 Claims, 5 Drawing Sheets

(56) References Cited

U.S. PATENT DOCUMENTS

| | | | |
|---|---|---|---|
| 2006/0116279 A1* | 6/2006 | Kogoi | B01J 21/063 502/103 |
| 2007/0053846 A1 | 3/2007 | Dave et al. | |
| 2008/0122141 A1 | 5/2008 | Bedal et al. | |
| 2008/0166558 A1* | 7/2008 | Baran, Jr. | B22F 1/025 428/403 |
| 2008/0300353 A1 | 12/2008 | Monsheimer et al. | |
| 2010/0028710 A1 | 2/2010 | Gros et al. | |
| 2010/0219382 A1* | 9/2010 | Abe | C09J 9/02 252/513 |
| 2011/0121113 A1* | 5/2011 | Zhu | B01F 3/1221 241/68 |
| 2012/0107438 A1 | 5/2012 | Bokodi et al. | |

FOREIGN PATENT DOCUMENTS

| | | |
|---|---|---|
| CN | 103088281 A | 5/2013 |
| WO | 2013087515 A1 | 6/2013 |
| WO | 2013128416 A2 | 9/2013 |

OTHER PUBLICATIONS

Iwasak et al., "Coating of Soft Metal Particles with Ceramic Fines using a Dry Mechanical Method", Journals of Material Processing Technology, vol. No. 146, Issue No. 3, pp. 330-337, Mar. 3, 2004.

Alonso et al., "Dry Mixing and Coating of Powders", Revista De Metalurgia, vol. No. 35, Issue No. 5, pp. 315-328, Oct. 30, 1999.

European Search Report and Opinion issued in connection with corresponding EP Application No. 15175076.7 dated Nov. 20, 2015.

Unofficial English Translation of Chinese Office Action issued in connection with corresponding CN Application No. 201410320967.8 dated Feb. 3, 2017.

Liu et al., "A Preliminary Investigation on Selective Laser Melting of M2 High Speed Steel", pp. 1-8, 2012.

Wirth et al., "A new process route for the production of polymer particles to be used in additive manufacturing applications", Apr. 23, 2013.

\* cited by examiner

METHOD FOR TREATING POWDER BY DRY MIXING AND POWDER TREATED THEREBY

BACKGROUND

The invention relates generally to methods for treating powders and powders treated thereby.

Additive manufacturing technology, i.e., 3D printing technology, such as direct metal laser sintering (DMLS), direct metal laser melting (DMLM), selective laser melting (SLM), selective laser sintering (SLS), electron-beam melting (EBM) or direct deposition, enables the quick production of complex shaped three-dimensional parts directly from metal powder. Generally, the additive manufacturing process uses a bed of loose powder, and for making fine-featured parts and reducing surface roughness of produced parts, the flowing and/or spreading properties of the metal powders usually need to be improved.

Some approaches have been proposed to increase the flowability of a powder by dry blending the powder with a fluidization additive to produce a dry blended mixture. These methods introduce a relatively large amount of fluidization additives into the powder and thus may change the element formulation of the powder, which is undesirable when the element formulation is critical to the produced part.

Therefore, while some of the proposed approaches have general use in other conventional industries, it is desirable to provide in additive manufacturing new methods for treating powders and powders treated thereby.

BRIEF DESCRIPTION

In one aspect, the invention relates to a method for treating a powder, comprising: dry mixing the powder with an effective amount of a treating additive to distribute a layer of the treating additive on a surface of a particle of the powder, a primary particle size of the treating additive being smaller than an average particle size of the powder.

In another aspect, the invention relates to a powder comprising a particle, the particle comprising a layer of a treating additive on a surface thereof, a primary particle size of the treating additive being smaller than an average particle size of the powder.

DRAWINGS

These and other features, aspects, and advantages of the present invention will become better understood when the following detailed description is read with reference to the accompanying drawings, wherein.

DETAILED DESCRIPTION

Unless defined otherwise, technical and scientific terms used herein have the same meaning as is commonly understood by one of ordinary skill in the art to which this disclosure belongs. The use of "including", "comprising" or "having" and variations thereof herein are meant to encompass the items listed thereafter and equivalents thereof as well as additional items.

Approximating language, as used herein throughout the specification and claims, may be applied to modify any quantitative representation that could permissibly vary without resulting in a change in the basic function to which it is related. Accordingly, a value modified by a term or terms, such as "about" is not to be limited to the precise value specified. In some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

In the specification and the claims, the singular forms "a", "an" and "the" include plural referents unless the context clearly dictates otherwise. Moreover, the suffix "(s)" as used herein is usually intended to include both the singular and the plural of the term that it modifies, thereby including one or more of that term.

As used herein, the term "or" is not meant to be exclusive and refers to at least one of the referenced components (for example, a material) being present and includes instances in which a combination of the referenced components may be present, unless the context clearly dictates otherwise.

Reference throughout the specification to "some embodiments", and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments.

Embodiments of the present invention relate to methods for treating powders and powders treated thereby.

As used herein the term "powder" or the like refers to a collection of particles. The particles may be of any configuration, shape or size as long as they are suitable for improvement in the flowability and/or spreadability thereof. In some embodiments, an average particle size of the powder is less than about 100 micrometers. In some embodiments, an average particle size of the powder is in a range of from about 0.2 micrometers to less than about 100 micrometers, such as about 0.2, 0.5, 1.0, 5, 10 or 45 micrometers.

As used herein the term "average particle size" refers to an average value of the particle sizes. In some embodiments, the average particle size refers to d50, i.e., the particle diameter at the 50% point on a particle size distribution curve when the total volume is 100%.

The particle size distribution of the powder may be any as appropriate for use. In some embodiments, a particle size distribution of the powder is the d10 is 10 micrometers and the d90 is 45 micrometers, wherein d10 and d90 represent particle diameters at 10% and 90% points on a particle size distribution curve when the total volume is 100%.

The powder may be made of any materials, such as, nickel, chromium, iron, niobium, tantalum, molybdenum, titanium, aluminum, cobalt, carbon, manganese, silicon, phosphorus, sulfur, boron, copper, or any combination thereof. In some embodiments, the powder is metallic. In some embodiments, the powder is an alloy.

Examples of the powder include, but are not limited to, the Inconel® 718 powder from Praxair Surface Technologies, Inc., Indianapolis, United States and the Inconel® 625 powder from Carpenter Powder Products Inc., Bridgeville, United States.

As used herein the term "the treating additive" or the like refers to a material useful to dry mix with a powder to distribute on a surface of a particle of the powder to improve the flowing and/or spreading performance(s) of the powder.

The treating additive may have a primary particle size of nano scale. As used herein the term "primary particle size" or the like refers to the size of a non-associated single treating additive particle. In some embodiments, the primary particle size of the treating additive is in a range of from about 1 nanometer to about 100 nanometers.

The treating additive may be made of any material. In some embodiments, the treating additive is fumed silica. In some embodiments, the treating additive is nano hydrophobic silica. In some embodiments, the treating additive is nano hydrophilic silica. Examples of silica based treating additives include, but are not limited to, R972, R202, R974, and A200 from Evonik Industries, and TS-610 and TS-720 from Cabot Corporation. In some embodiments, the treating additive is nano carbon, such as carbon powder, carbon black, graphite, or graphene.

The powder and the treating additive may be dry mixed in any suitable ways. In mixing, the particles are not damaged, thereby avoiding defects caused thereby. In some embodiments, the mixing is mechanical mixing. In some embodiments, the powder is mixed with the treating additive by a tumbler mixer, a V blender, a ball mixer or other instrument.

The mixing environment may be dependent on the specific powder, the specific treating additive, the specific requirements of the treated powder, etc. In some embodiments, the powder and the treating additive are sealed during mixing. In some embodiments, the mixing is at an ambient temperature and an ambient pressure.

The particles of the treating additive may aggregate before mixing, but as can be seen from the following examples, after the powder is mixed with a trace amount of treating additive, the treating additive is distributed to surfaces of particles of the powder, the spreading and/or flowing properties of the powder are improved, and the element formulation of the powder does not obviously change. In some embodiments, the treating additive distributed to the surfaces of particles of powder has an average particle size of from about 1 nanometer to about 300 nanometers or from about 1 nanometer to about 100 nanometers.

EXAMPLES

The following examples are included to provide additional guidance to those of ordinary skill in the art in practicing the claimed invention. These examples do not limit the invention as defined in the appended claims.

Example 1

Inconel® 718 powders (average particle size: −10-45+ micrometer (D10: 10 μm; D90: 45 μm)) from Praxair Surface Technologies, Inc., Indianapolis, United States, or Inconel® 625 powders (average particle size: −10-45+micrometer (D10: 10 μm; D90: 45 μm)) from Carpenter Powder Products Inc., Bridgeville, United States, and a treating additive (hydrophobic fumed silica (BET surface area >100 m²/g with less than 20 nm primary particle size) or nano carbon (with less than 100 nm primary particle size and without oxidation surface treatment) were added to one plastic bottle. The bottle was sealed and shaken by a tumbler mixer at a speed of 110 rotations per minute (rpm) to mix the powder and the treating additive. The dosages of the powder and the treating additive, and the mixing time are listed in table 1 below. The dosage of the treating additive is represented in ppm with respect to a total weight of the treating additive and the powder.

TABLE 1

| powder | Powder dosage | Treating additive | Treating additive dosage | Mixing time |
|---|---|---|---|---|
| Inconel® 718 | 50 g | hydrophobic fumed silica | 3700 ppm 800 ppm 80 ppm 50 ppm 30 ppm 20 ppm | 10 minutes |
| Inconel® 625 | | nano carbon | 100 ppm 50 ppm 25 ppm | 5 minutes |

Before and after mixing, some particles were analyzed using a scanning electron microscope (SEM) and FIGS. 1-4 respectively show SEM pictures of a part of a surface of an Inconel® 718 particle before mixing with a treating additive, a part of a surface of an Inconel® 718 particle after mixing with 80 ppm hydrophobic fumed silica, a part of a surface of an Inconel® 625 particle before mixing with a treating additive and a part of a surface of an Inconel® 625 particle after mixing with 50 ppm nano carbon. It can be seen from FIGS. 1-4 that the nano-scale (<100 nm) treating additives were distributed to (coated on) surfaces of micro-sized particles after mixing.

Example 2

Figure 1:
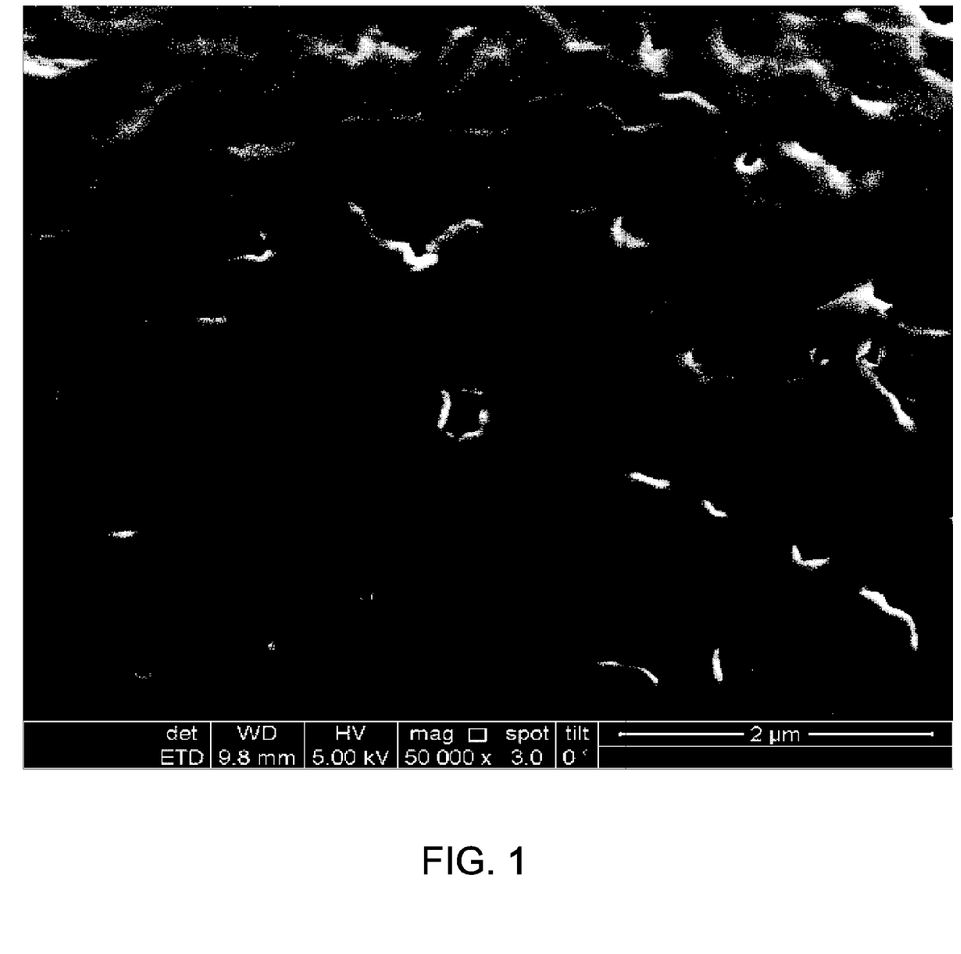
FIG. 1 is a scanning electron microscope (SEM) picture of a part of a surface of an Inconel® 718 particle before mixing with a treating additive.
Figure 2:
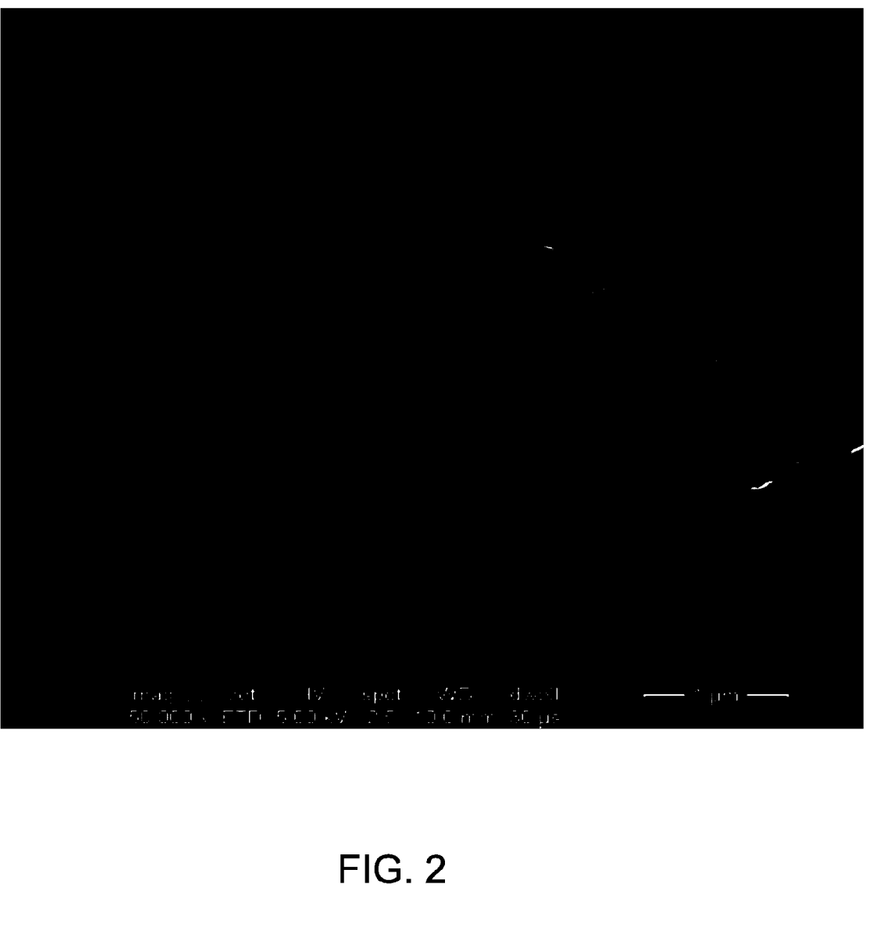
FIG. 2 is an SEM picture of a part of a surface of an Inconel® 718 particle after mixing with 80 ppm hydrophobic fumed silica.
Figure 3:
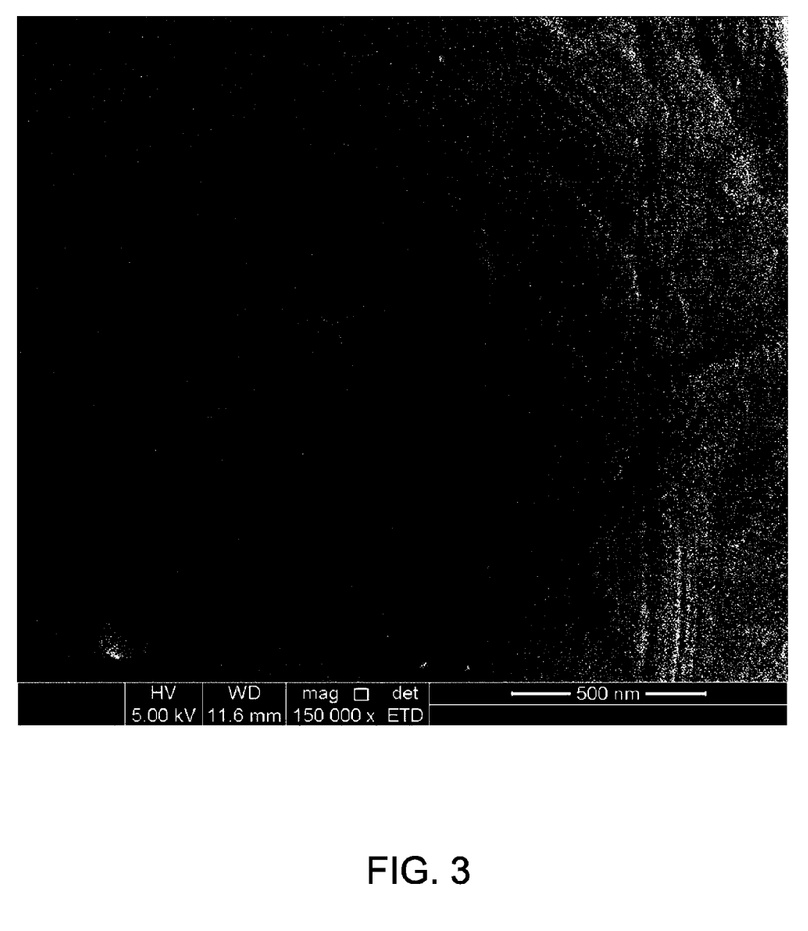
FIG. 3 is an SEM picture of a part of a surface of an Inconel® 625 particle before mixing with a treating additive.
Figure 4:
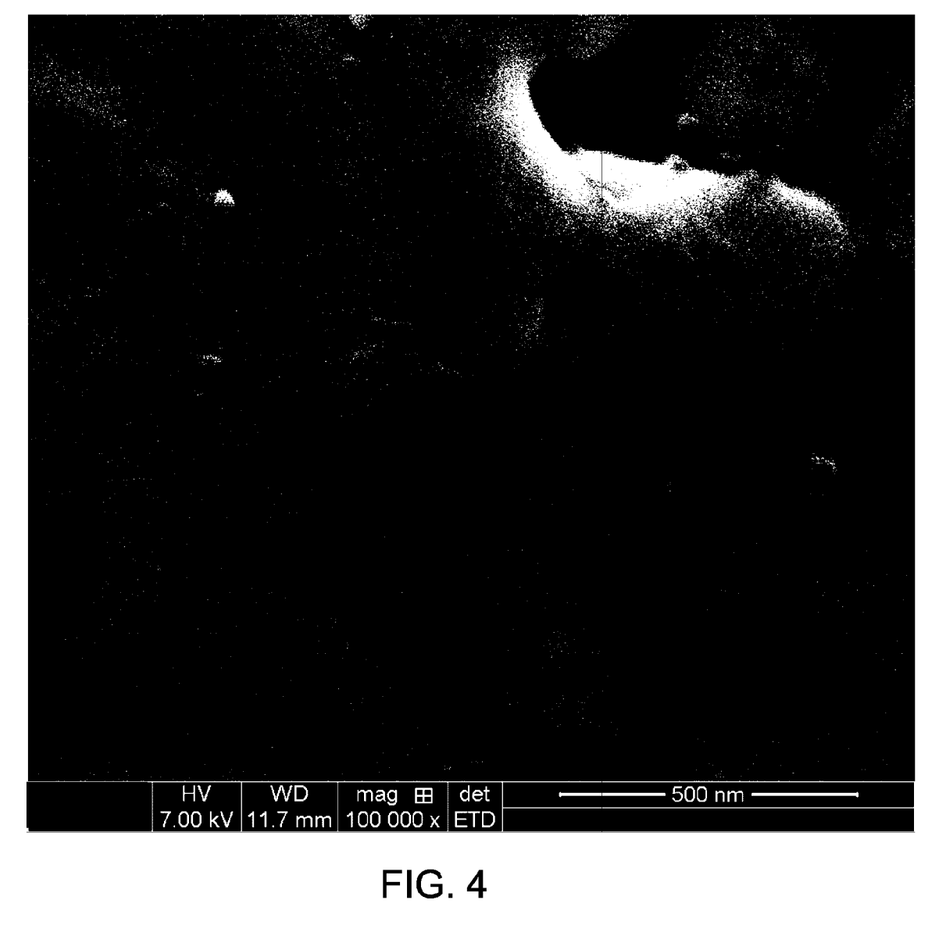
FIG. 4 is an SEM picture of a part of a surface of an Inconel® 625 particle after mixing with 50 ppm nano carbon.
Figure 5:
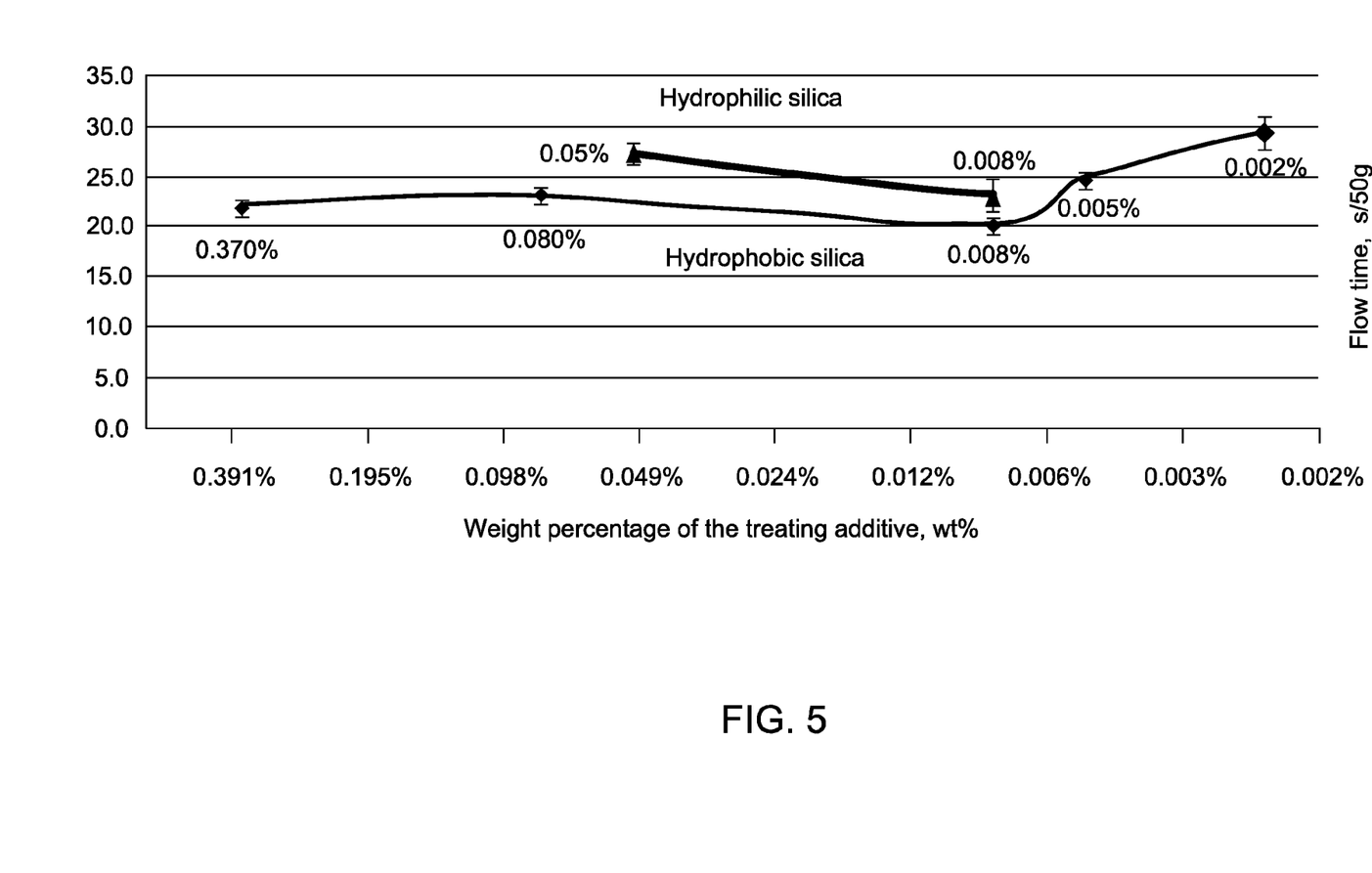
FIG. 5 illustrates the flow time of 50 g Inconel® 718 powders treated with different weight percentages of treating additives.

The flowability was measured by a Hall flowmeter according to ASTM B213 standards. The flow time of 50 g Inconel® 718 powder treated with different weight percentages of a treating additive (hydrophobic or hydrophilic fumed silica) was recorded through the Hall flowmeter with 0.1 inch diameter of funnel and is shown in FIG. 5. For the samples treated with 80 ppm hydrophilic fumed silica and 20 ppm hydrophobic fumed silica, the flow through the Hall funnel was initiated by a one-time knocking Other samples' flow was free flow. The x axis (horizontal axis) in FIG. 5 is by logarithmic scale.

It can be seen from FIG. 5 that the flow time of the treated powder varied when the treating additives and the weight percentages thereof changed and there is no clear trend when weight percentages of the treating additives changed. Surprisingly, the powders treated with less than 100 ppm treating additives had acceptable flowabilities. The powders treated with 80 ppm treating additives had the best flowabilities as their flow times were the shortest.

Example 3

The Carr indices and relevant parameters of treated and non-treated Inconel® 718 powders were measured through the standard process of ASTM D6393 and are shown in table 2 below. Table 2 shows that all parameters changed in desired directions after treating and hence the flowability of the powder improved after treating.

TABLE 2

| Carr indices | Inconel ® 718 powder | Inconel 718 ® powder treated with 80 ppm hydrophobic fumed silica |
|---|---|---|
| Angle of repose | 32.14° | 29.50°↓ |
| Angle of fall | 28.82° | 21.73°↓ |
| Angle of difference | 3.32° | 7.77°↑ |
| Angle of spatula | 37.32° | 31.20°↓ |
| Loosed bulk density | 4.36 g/cm³ | 4.77 g/cm³ ↑ |
| Packed bulk density | 4.76 g/cm³ | 5.21 g/cm³ ↑ |
| Uniformity | 2.05% | 2.05% |
| Carr index | 87 | 91↑ |

Example 4

Powder spreadability was measured through spreading a layer of the Inconel® 625 powder (thickness: about 0.5 mm for the powder treated with hydrophobic fumed silica and about 0.05 mm for the powder treated with nano carbon) by a stainless tube on a smooth stainless substrate and is summarized in tables 3 and 4 below.

TABLE 3

| Weight percentage of hydrophobic fumed silica | spreadability |
|---|---|
| 80 ppm | High |
| 50 ppm | High |
| 30 ppm | Medium |
| 20 ppm | low |
| 0 | Couldn't spread |

TABLE 4

| Weight percentage of nano carbon | spreadability |
|---|---|
| 50 ppm | Medium |
| 25 ppm | Low |
| 0 | Couldn't spread |

Tables 3 and 4 illustrate that the trace amount of treating additives improved the spreadabilities of the powders.

Example 5

The composition specification of Inconel® 718 powder is shown in table 5 below. The heavy elements of two Inconel® 718 powder samples and 50 ppm and 80 ppm hydrophobic fumed silica treated Inconel® 718 powder samples were measured by X Ray fluorescene (XRF), and the light elements were determined by Inductively Coupled Plasma Optical Emission Spectrometer (ICP). The results are shown in tables 6 and 7 below.

TABLE 5 composition specification of Inconel ® 718 powder

| Element | wt % |
|---|---|
| Nickel (plus Cobalt) | 50.00-55.00 |
| Chromium | 17.00-21.00 |
| Iron | Balance |
| Niobium (plus Tantalum) | 4.75-5.50 |
| Molybdenum | 2.80-3.30 |
| Titanium | 0.65-1.15 |

TABLE 5-continued composition specification of Inconel ® 718 powder

| Element | wt % |
|---|---|
| Aluminum | 0.20-0.80 |
| Cobalt | 1.00 max. |
| Carbon | 0.08 max. |
| Manganese | 0.35 max. |
| Silicon | 0.35 max. |
| Phosphorus | 0.015 max. |
| Sulfur | 0.015 max. |
| Boron | 0.006 max. |
| Copper | 0.30 max. |

TABLE 6 element measurement by XRF

| | Sample | | | |
|---|---|---|---|---|
| Element | Inconel ® 718-1 wt % | Inconel ® 718-2 wt % | 50 ppm hydrophobic fumed silica treated Inconel ® 718 wt % | 80 ppm hydrophobic fumed silica treated Inconel ® 718 wt % |
| Ti | 1.00 | 0.93 | 1.10 | 0.99 |
| Cr | 19.73 | 19.94 | 19.88 | 19.96 |
| Fe | 17.46 | 17.57 | 17.19 | 17.63 |
| Co | 0.86 | 0.83 | 0.81 | 0.83 |
| Ni | 51.24 | 51.61 | 51.72 | 51.55 |
| Nb | 5.05 | 5.06 | 4.87 | 4.96 |
| Mo | 3.26 | 3.22 | 3.45 | 3.18 |

TABLE 7

Al and Si weight percentage (wt %) by ICP

| Sample | Al, wt % | Si, wt % |
|---|---|---|
| Inconel ® 718-1 | 0.55 | 0.077 |
| Inconel ® 718-2 | 0.57 | 0.081 |
| Inconel ® 718 treated with 80 ppm hydrophobic fumed silica-1 | 0.64 | 0.075 |
| Inconel ® 718 treated with 80 ppm hydrophobic fumed silica-2 | 0.63 | 0.075 |

Note:
-1 and -2 are duplicates for the same batch of treated or non-treated powder The tables above show that the trace amount of nano-scale treating additives didn't obviously change the element formulation of the alloy powder. Most of the element contents of the treated metal powder are still in the specification range of the powder. The influence of the coating on the element formulation of the powder could be neglected, which ensures the element formulation of the product derived from the treated powder.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A method for treating a powder, comprising:
   dry mixing the powder with an effective amount of a treating additive to distribute a layer of the treating additive on a surface of a particle of the powder, a primary particle size of the treating additive being smaller than an average particle size of the powder,
wherein the powder is a metallic alloy,
wherein the powder has an initial angle of repose of about 32 degrees, and
wherein a weight of the treating additive is in a range from 50-80 ppm of a total of the weight of the treating additive and a weight of the powder.

2. The method of claim 1, wherein said dry mixing occurs for a duration of 1-30 minutes.

3. The method of claim 1, wherein the dry mixing is by a tumbler mixer, a V blender, a ball mixer, or other instrument.

4. The method of claim 1, wherein the average particle size of the powder is less than 100 micrometer.

5. The method of claim 1, wherein the primary particle size of the treating additive is in a range of from 1 nanometer to 100 nanometers.

6. The method of claim 1, wherein the treating additive is nano silica.

7. The method of claim 1, wherein the treating additive decreases the angle of repose of the powder.

8. The method of claim 1, wherein the treating additive is nano carbon.

9. A powder comprising a particle, the particle comprising a layer of a treating additive on a surface thereof, a primary particle size of the treating additive being smaller than an average particle size of the powder,
wherein the powder is metallic,
wherein the powder has an initial angle of repose of about 32 degrees,
wherein said treating additive increases a bulk density of said powder by an amount in a range of about 9.5%, and
wherein a weight of the treating additive is in a range from 50-80 ppm of a total of the weight of the treating additive and a weight of the powder.

10. The powder of claim 9, wherein said resulting mixture has an angle of repose that is less than the initial angle of repose of the metallic powder.

11. The powder of claim 9, wherein the average particle size of the powder is less than 100 micrometers.

12. The powder of claim 9, wherein the primary particle size of the treating additive is in a range of from 1 nanometer to 100 nanometers.

13. The powder of claim 9, wherein the treating additive is nano silica.

14. The powder of claim 9, wherein the treating additive is nano carbon.

15. A method for treating a powder, comprising:
dry mixing the powder with an effective amount of a treating additive to distribute a layer of the treating additive on a surface of a particle of the powder, a primary particle size of the treating additive being smaller than an average particle size of the powder,
wherein the powder is metallic,
wherein the powder has an initial angle of repose of about 32 degrees,
wherein the treating additive decreases the angle of repose by 8%, and
wherein a weight of the treating additive is in a range from 50-80 ppm of a total of the weight of the treating additive and a weight of the powder.

* * * * *